CLARENCE A. BROWN
CLARENCE N. BROWN
INVENTOR.

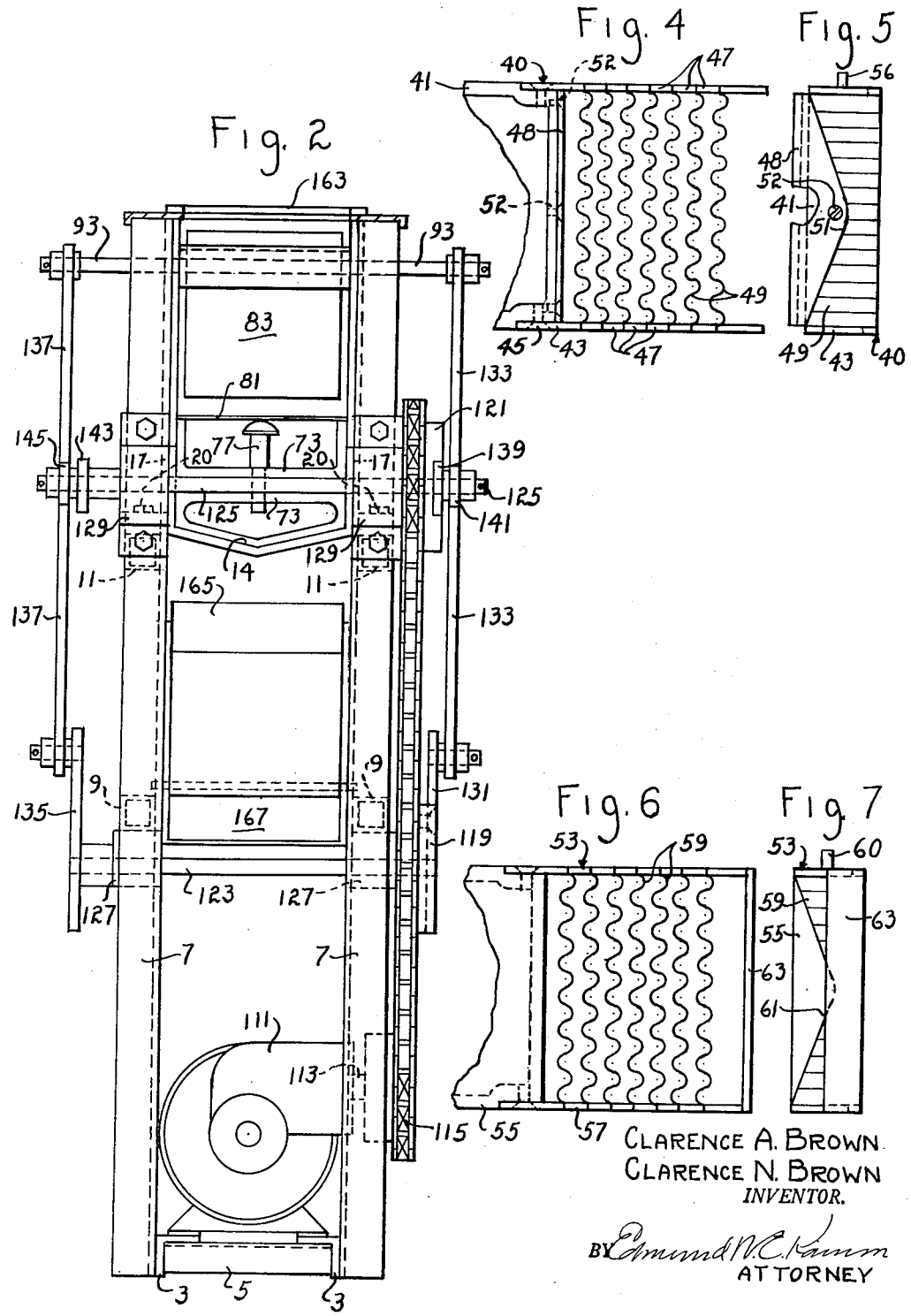

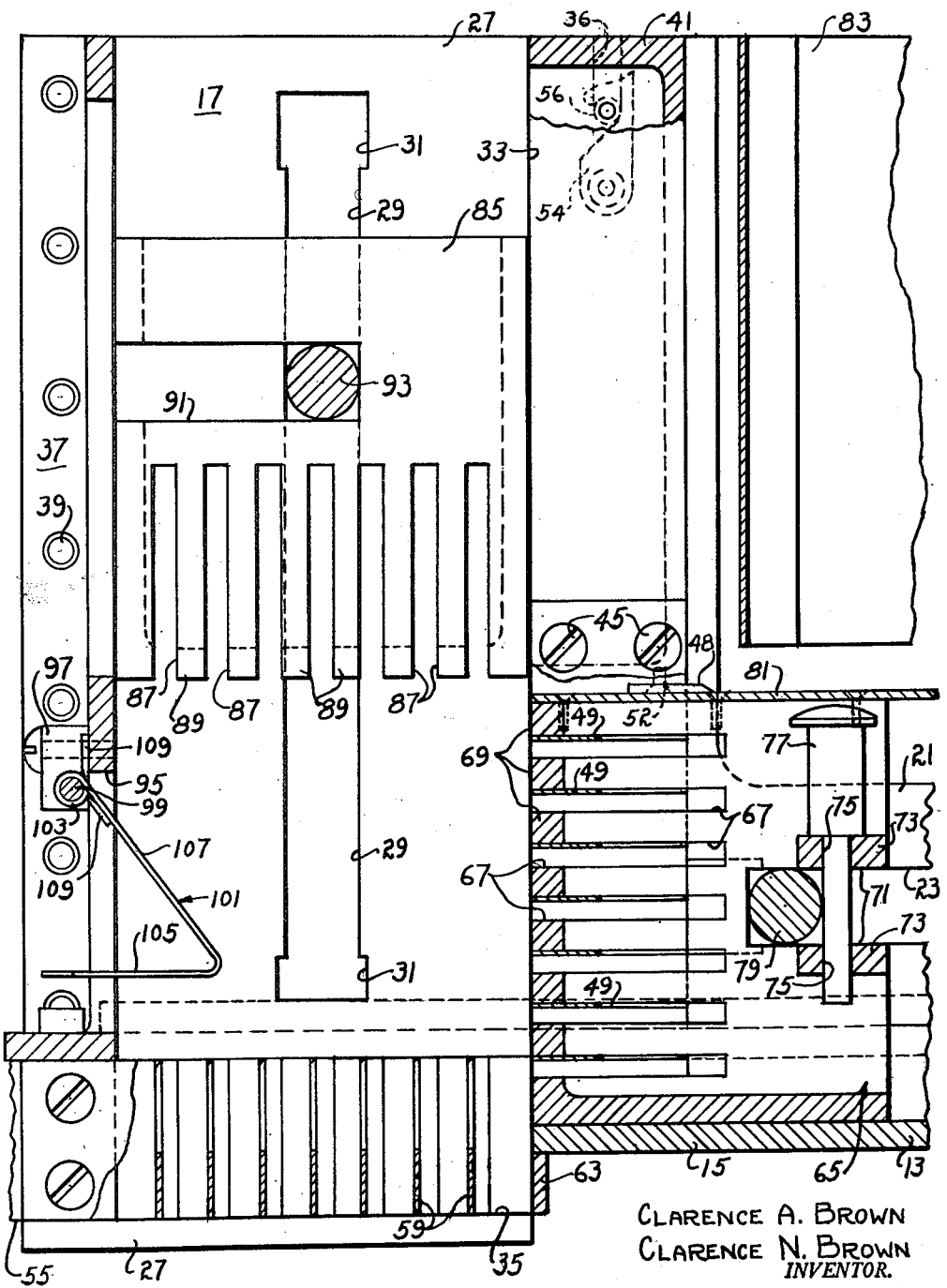

May 4, 1954 C. A. BROWN ET AL 2,677,403
MACHINE FOR CUTTING VEGETABLES INTO STRIPS
Filed Dec. 12, 1950 4 Sheets-Sheet 4
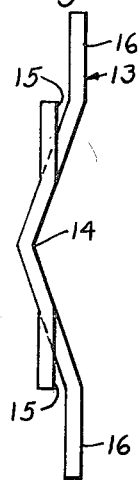
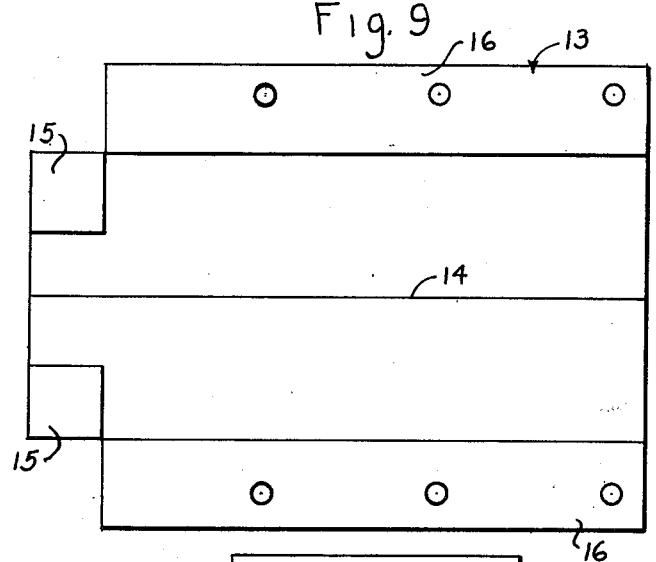
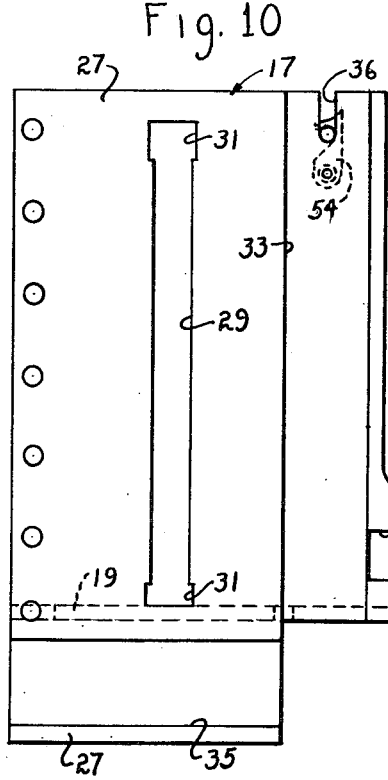
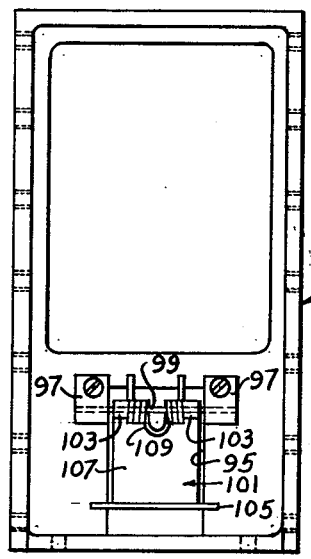
CLARENCE A. BROWN
CLARENCE N. BROWN
INVENTOR.
BY Edmund N. E. Kamm
ATTORNEY Patented May 4, 1954

2,677,403

UNITED STATES PATENT OFFICE 2,677,403

MACHINE FOR CUTTING VEGETABLES INTO STRIPS

Clarence A. Brown and Clarence N. Brown, Wabash, Ind.

Application December 12, 1950, Serial No. 200,348

8 Claims. (Cl. 146—78)

This invention relates to a vegetable cutting machine. More specifically, it relates to a machine for cutting a vegetable, such as a potato into numerous "chips," which have the form of a rectangular parallelepiped, but having the four oblong faces corrugated instead of planar.

We are aware that a number of other machines have been patented for performing a similar task. For instance, the patent to Love 2,088,298, July 27, 1937, discloses in Figure 7 a potato of substantially the form produced by our machine. Further, the patent to Young 2,303,595, issued December 1, 1942, discloses the broad structure of our machine.

It is an object of our invention to produce a power operated device suitable for use in hotels, restaurants, institutions and other food preparing establishments in which a supply of the vegetables to be cut may be placed and which will then proceed to cut one vegetable at a time into the "chips."

It is another object of our invention to provide a machine which will cut the vegetables squarely so that the chips will be uniform and will have a substantially square cross-section rather than a diamond shaped section.

Another object of the invention is to provide means for preventing the vegetable from rolling or coming apart after the first cutting operation has been performed.

Yet another object of the invention is to provide means for readily removing the cutting blades and rams for cleaning, etc.

A further object of the invention is to provide a self-contained machine which is totally enclosed except for the feed hopper.

It is still another object of the invention to provide a discharge chute for the cut vegetables which also serves as a closure for the housing.

These and other objects will become apparent from a study of the drawings which are attached hereto, made a part hereof and in which:

Figure 2 is an end elevation of the machine viewed from the right of Figure 1.

Figure 3 is an enlarged side elevation with parts in section showing the knife or blade holders, rams and the vegetable holding mechanism.

Figure 4 is a front elevation of the vertical blade holder with the blades in place.

Figure 5 is an elevation of the holder viewed from the right of Figure 4.

Figure 6 is a front elevation of the horizontal blade holder.

Figure 7 is an elevation of the holder of Figure 6 viewed from the right thereof.

Figure 8 is an end view of the bottom plate viewed from the left in Figure 3.

Figure 9 is a top plan view of the bottom plate.

Figure 10 is a side elevation of a side plate.

Figure 11 is an elevation of the back plate viewed from the right in Figure 3.

Frame and cylinder construction

Figure 1:
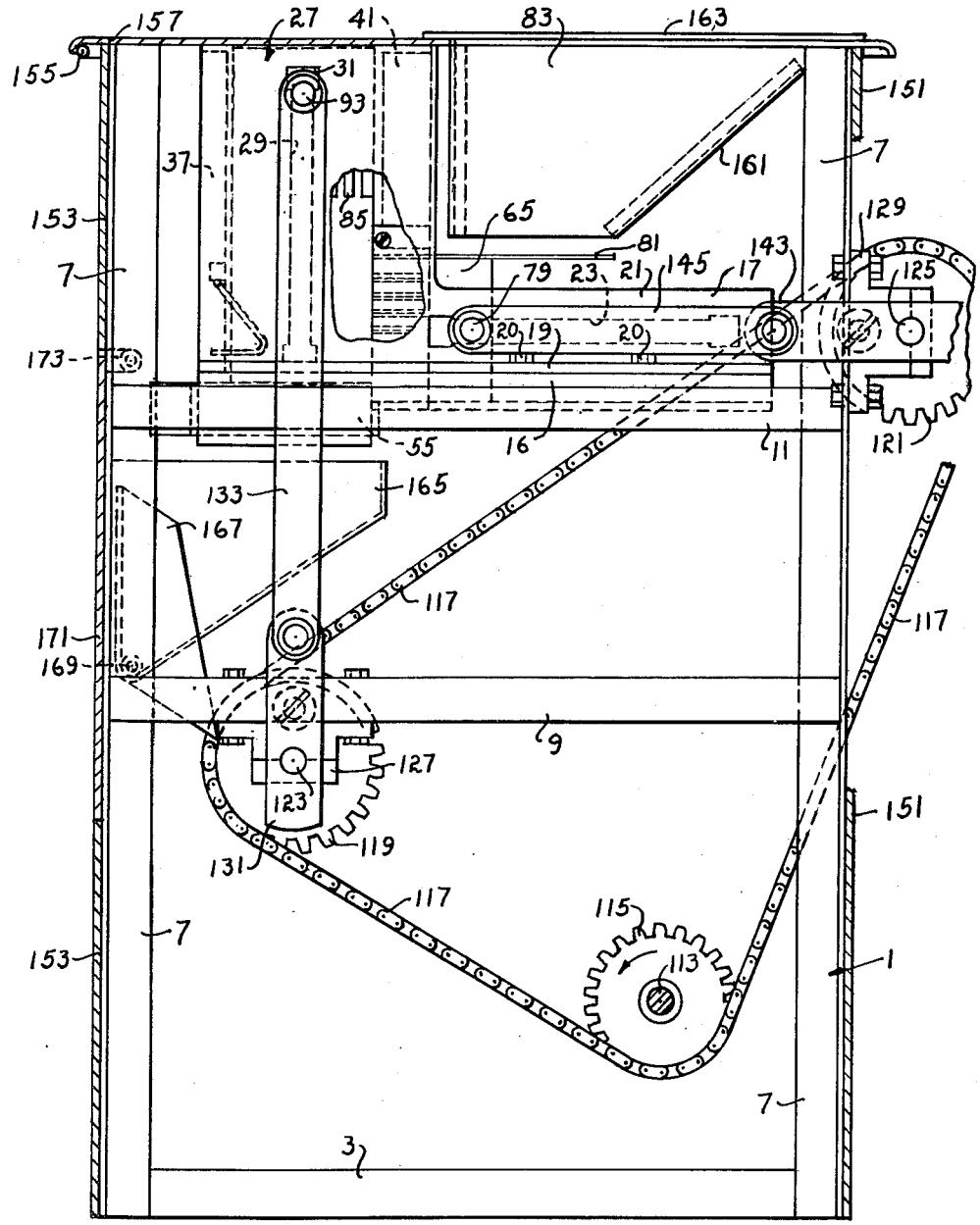
Figure 1 is a side elevation of the machine showing the general construction.

Referring to the drawings, the numeral 1 refers generally to a frame which is made up of two longitudinal angles 3, which are joined by transverse angles 5 to form a base. A vertical angle post 7 rises from each of the four corners of the base and each pair is connected by horizontal square tubes 9 and 11 which run parallel to angles 3. The posts extend above the level of the upper tubes 11.

Mounted on top of the tubes 11 (Figs. 1, 2, 8 and 9) is a bottom plate 13 which is formed with a shallow V-shaped channel 14 bordered by flanges 16 which rest upon the tubes. The plate terminates at its inner end in a pair of horizontal pads 15 for a purpose to be described.

A pair of side plates 17 (Fig. 10) are formed to be complementary and have lateral flanges 19 which rest upon the bottom plate flanges 16 and together with which they are bolted to the tubes 11 at 20.

The side plates have portions 21 which extend horizontally, parallel to the V-channel and are provided with horizontal guide slots 23 which are formed with enlarged openings 25 at the outer ends.

The side plates also have vertical extensions 27 formed at their inner ends. These extensions are provided with vertical guide slots 29 which are enlarged at both ends, at 31.

A vertical channel 33 is formed adjacent the edge of the extension 27 nearest the portion 21 on each plate and a horizontal channel 35 is also formed at the bottom of the extension for the reception of the blade holders, as will be described. A slot 36 extends in from the top of channel 35 of one of the side plates.

A back plate 37 is mounted between the side plates by means of suitable screw fasteners 39.

Knife holders

The vertical blade holder 40, shown in detail in Figures 3, 4 and 5, comprises a rectangular casting 41 which has a pair of extensions 43 fixed thereto by screws 45. These extensions are built up of sections 47 which are brazed or otherwise fixed to the ends of the knife blades 49. A knife blade 43 is fixed by screws 52 to the blade end of the casting 41, pointing toward the ram when it is in retracted position.

The blades are corrugated and are concaved on the cutting side, as shown at 51 (Fig. 5), for a purpose to be described.

The blade holder just described is slidably mounted in the groove 33 and rests on the pads 15 of the bottom plate. A catch 54 is mounted on one of the side plates 17 and engages a pin 56 on the holder which extends through the slot 36 to hold the blade holder in place.

The horizontal blade holder is shown in Figures 3, 6 and 7, is of similar construction having a rectangular block 55, extensions 57 and knife blades 59 which are concaved at 61. In addition, the extensions are tied together by a bar 63 which is only half the depth of the blade. This bar underlies the pads 15 as shown in Figure 3. This blade holder slides into the grooves 35 in the side plates and abuts on the end of the bottom plate, which positions it. A catch similar to 54 keeps the blade holder in position by engaging pin 60.

It should be noted that the concavity of the blades 59 forms in effect an extension of the V-channel of the bottom plate.

Ram construction

The side plates and the bottom plate define a channel having a V-bottom and vertical sides and a ram 65 having an outline which fits snugly, but slidably in this channel, is mounted therein. The ram is preferably in the form of a hollow casting having a front side and bottom walls, as shown in Figure 3. The front wall as well as the portions of the side walls adjacent thereto are slotted transversely at 67 to form a plurality of parallel pusher bars 69 which lie above and below the knife blades 49 and serve to push the vegetables entirely through the knives so that they will rest upon the knives 59 for the second cut.

A horizontal slot 71 is formed in each side wall of the ram at the outer end thereof and in alignment with the guide slots 23. A pair of bars 73 extends between the side walls, one above and the other below the slots 71. Aligned holes 75 are formed in the bars and a shouldered pin 77 is slidably mounted therein to connect the ram to the actuating bar 79 which is slidably mounted in the guides 23. The bar is confined between the closed end of the slots 71 and the pin.

A shutter plate 81 is mounted on the top of the piston or ram 65 and extends back over the casting, and pin, as shown in Figures 1 and 3, to serve as a closure for the hopper 83, to be later described.

A ram 85 having a rectangular transverse section is mounted for sliding in the tube formed by the side plates 27, back plate 37 and the vertical blade holder 41. It comprises a hollow casting which is slotted transversely at 87 to form bars 89 which serve to push the vegetables through the horizontal blade holder 55.

The ram has notches 91 formed therein for the reception of the actuating bar 93 which is slidably mounted in the guides 29.

Support mechanism

As shown, particularly in Figure 3, the back plate 37 is formed with a rectangular opening 95 and a pair of clamps 97 are fixed to the exterior of the plate adjacent of the opening. A shaft 99 is mounted on the clamps and extends transversely of the opening. A support 101 made of sheet metal and bent into a V-shape has one edge notched and the resulting ears formed into cylindrical bearings 103 which are pivotally mounted on the shaft. The bottom leg 105 of the support is substantially horizontal whereas the other leg 107 inclines upwardly and toward the shaft.

A spring 109 is mounted on the shaft and bears on the leg 107 and on the back plate so as to urge the support inwardly to the Figure 3 position, in which it lies in the path of the vegetable passing through knives 49 and also into the path of the ram 85. Its purpose is to hold the vegetable against rolling until the ram 85 engages it to assist in producing rectangular chips. The ram moves the support out of its path as it descends.

Driving mechanism

A reduction gear in head motor 111, which is provided with a suitable switch (not shown) is mounted on the base of the frame 1 and the output shaft 113 carries a sprocket 115 which, by means of a chain 117, drives sprockets 119 and 121, mounted on shafts 123 and 125, respectively.

Shaft 123 is mounted in bearings 127 supported on tubes 9 while shaft 125 is mounted in bearings 129 supported on posts 7.

Sprocket 119 has fixed to it a crank arm 131 which is pivotally connected to one end of a link 133, the other end of which is connected to one end of the actuating bar 93. It will be seen from Figure 2 that the shaft 123 extends across the frame and carries a crank 135 and link 137 which are connected to the other end of the actuating bar 93.

Sprocket 121 has fixed to it a crank 139 which is pivotally connected to one end of a link 141, the other end of which is connected to one end of the actuating bar 79. It will be seen from Figure 2 that the shaft extends across the frame and carries a crank 143 and link 145 which are connected to the other end of the actuating bar 79.

The cranks 131 and 139 are timed so that the ram 65 completes its stroke before the ram 85 reaches the level of the ram 65 as is clearly shown in Figure 1. The cranks are kept in time by the chain and sprocket drive.

Housings

A front and a rear sheet metal housing 151, 153 are suitably attached to the frame 1 and side housings (not shown) are carried by 151 and 153 in any suitable manner.

Hinges 155, fixed to the top of the back plate 153, support the top cover plate 157 so that it may be swung away from its position over the ram 85 and blade holder 41 to permit access thereto.

The hopper 83 is set loosely into position over the horizontal trough and has a sloping bottom 161 which directs the vegetables toward the plate 81 so that they cannot fall behind the ram 65. The hopper is supported by a flange 163 which rests on the cover 157, the posts 7 and the other housings. When the hopper is lifted from its position, the trough and ram are exposed.

A chute 165 is fixed to the rear posts 7 and underlies the horizontal knife holder so as to receive the finished vegetables therefrom. An extension chute 167 is pivotally mounted at 169 so as to fold up within the housing. A door 171 is pivotally mounted at 173 and may be raised to give access to the chute 167 which may be then extended to discharge the product into a suitable vessel. Suitable means (not shown) may be used to hold the door open. The door also gives access to the horizontal knife holder.

Operation

The operator of the machine will fill the hopper 83 with the vegetable to be cut up and will start the motor 111.

If we assume that the parts occupy the positions shown in Figure 1, the rotation of sprockets 115, 119 and 121 is counterclockwise, as indicated by the arrow on 115. The crank 131 will pull the link 133 downwardly and move the ram 85 toward the horizontal knife holder, while the cranks 139, 143 oscillate the links 141, 145 quickly in a clockwise direction to withdraw the ram 65 from the vertical knife holder 40.

The shutter plate 81 is withdrawn from the bottom of the hopper 83 by the ram 65 and a vegetable will drop into the trough 14 of the bottom of plate 13. Since the trough is V-shaped, the vegetable will tend to occupy a central position therein.

As the links 133 and 145 reach the limit of their respective strokes, the direction of travel of the rams will be reversed and the vegetable which was deposited in the trough will be forced into the knives 49. The pusher bars 69 will first enter the spaces between the knives at the sides thereof and will progressively enter these spaces because of the concave construction of the blades. This concavity also tends to center the vegetable on the knives.

As the ram advances to the limit of its inward stroke, the vegetable is forced through the knives and is cut into horizontal slices which are corrugated, the axes of the corrugations extending in the direction of motion of the vegetable.

As the vegetable passes through the knives 49 it passes on to the knives 59 and since it was substantially centered in the trough, it will be also substantially centered in the concavity of the knives 59 so that it will not tend to roll. As the vegetable is positioned on the knives 59, the support 101 is deflected by it against the action of the spring 109. This support also assists in holding the vegetable in proper position so that when the ram 85 descends, the vegetable will be forced into the knives 59 in a direction which is perpendicular to the planes of the slices first formed. This insures that the chips have a rectangular cross-section.

The ram 85 forces the cut vegetable through the knives 59 and into the trough 165 from which it passes down the extension trough 167 into a suitable vessel, not shown.

The knife blade 48 is provided to cut large vegetables as they drop in front of the horizontal ram, prior to entering the knives 49.

As stated previously, the shutter 81 prevents vegetables in the hopper from falling into the trough behind the ram 65.

The rate of reciprocation of the rams is preferably held to 30 R. P. M. or less.

It should also be noted that the ram 65 has fully completed its stroke by the time that the ram 85 reaches the level of the upper part of ram 65, as is clearly shown in Figure 1. Also, as ram 85 descends, the support 101 is moved by the ram out of the path of the ram.

When it is desired to clean the machine, it is necessary merely to remove the hopper, which is held in place by gravity and to swing the cover 157 about hinge 155, out of the way. This exposes the entire upper portion of the machine.

To remove the ram 65, the motor is run until the ram occupies its fully withdrawn position. The pin 77 is removed and the ram is moved toward the knives far enough to disengage the bar 79 from the slots 71 whereupon the ram may be lifted out of the trough. The vertical knife holder 41 may be lifted out of the machine.

The ram 85 may now be removed by moving it toward the position which was occupied by the blade holder 41, so as to disengage slots 91 from bar 93 whereupon the ram 85 may be lifted out of the machine.

When the door 171 is opened, the horizontal knife holder may be withdrawn from the machine.

This exposes the trough and back plate fully so that they may be properly cleansed. The removed parts may be cleaned and the machine reassembled by reversing the process just described.

The enlargements 25 and 31 permit the bars to be withdrawn from the side plates without completely disassembling of bearing structures at the ends of the bars.

It is obvious that various changes may be made in the form, structure and arrangement of parts without departing from the spirit of the invention. Accordingly, applicants do not desire to be limited to the specific embodiment disclosed herein primarily for purposes of illustration; but instead, they desire protection falling fairly within the scope of the appended claims.

What we claim to be new and desire to protect by Letters Patent of the United States is:

1. A machine for cutting vegetables comprising a bottom plate having a wide, shallow, V-shaped, longitudinal groove therein, a side plate extending upwardly on either side thereof to form a trough, a knife holder disposed transversely of the trough at one end thereof, knives mounted in said holder, a ram slidably mounted in the trough and having side and bottom walls conforming to and having continuous contact with the walls of the trough, a plurality of pusher bars formed on the front face of the ram, adapted to enter the spaces between the knives, means for reciprocating said ram, a second knife holder disposed on the side of the first holder opposite the ram, said second holder having a plurality of knives therein, said knives being concaved downwardly to form a trough which is aligned with the groove of said first mentioned trough and at substantially the same horizontal level.

2. A machine for cutting vegetables comprising a bottom plate having a wide, shallow, V-shaped, longitudinal groove therein, a side plate extending upwardly on either side thereof to form a trough, a knife holder disposed transversely of the trough at one end thereof, knives mounted in said holder, a ram slidably mounted in the trough and having side and bottom walls conforming to and having continuous contact with the walls of the trough, a plurality of pusher bars formed on the front face of the ram, adapted to enter the spaces between the knives, means for reciprocating said ram, a second knife holder disposed on the side of the first holder opposite the ram and at a level to receive the vegetable as it is passed through the first mentioned knives and a support disposed above the second holder for yieldably engaging and supporting the vegetable against movement after it is passed through said first mentioned knives, said second knives being concaved downwardly to form a trough which is aligned with the groove of the first mentioned trough and at substantially the same horizontal level.

3. A machine for cutting vegetables comprising a bottom plate, a side plate extending upwardly on either side thereof to form a trough, a knife holder disposed transversely of the trough at one end thereof, knives mounted in said holder, a ram slidably mounted in the trough, a plurality of pusher bars formed on the front face of the ram, adapted to enter the spaces between the knives, means for reciprocating said ram, a second knife holder disposed on the side of the first holder opposite the ram and at a level to receive the vegetable as it is passed through the first mentioned knives and a support disposed above the second holder for yieldably engaging and supporting the vegetable against movement after it is passed through said first mentioned knives, said support comprising a V-shaped sheet member, means for pivotally mounting said member at its upper end and resilient means for urging it toward said first holder and for holding it in position over the second holder.

4. A machine for cutting vegetables comprising a bottom plate, a side plate extending upwardly on either side thereof to form a trough, a knife holder disposed transversely of the trough at one end thereof, knives mounted in said holder, a ram slidably mounted in the trough, a plurality of pusher bars formed on the front face of the ram, adapted to enter the spaces between the knives, means for reciprocating said ram, a second knife holder disposed on the side of the first holder opposite the ram and at a level to receive the vegetable as it is passed through the first mentioned knives and a support disposed above the second holder for yieldably engaging and supporting the vegetable against movement after it is passed through said first mentioned knives, said support comprising a V-shaped sheet member, means for pivotally mounting said member at its upper end with its apex directed toward the first holder and resilient means for urging it toward said first holder and for holding it in position over the second holder.

5. A machine for cutting vegetables comprising a bottom plate, a side plate extending upwardly on either side thereof to form a trough, a knife holder disposed transversely of the trough at one end thereof, a ram slidably mounted in the trough, a plurality of pusher bars formed on the front face of the ram, adapted to enter the spaces between the knives, means for reciprocating said ram, a second knife holder disposed on the side of the first holder opposite the ram and at a level to receive the vegetable as it is passed through said first knives, a back plate disposed, in substantially parallel, spaced relation to the first holder, an opening formed in the back plate, a support comprising a strip of metal, means for pivotally mounting the strip, by one edge, in the opening, yieldable means for pivoting the strip toward the first holder and extending it over the knives of the second holder, into the path of the vegetable as it is passed through the former, said support serving to hold the vegetable against movement after it has passed the first holder.

6. A machine for cutting vegetables comprising a bottom plate, a side plate extending upwardly on either side thereof to form a trough, a knife holder disposed transversely of the trough at one end thereof, knives mounted in said holder, a ram slidably mounted in the trough, a plurality of pusher bars formed on the front face of the ram, adapted to enter the spaces between the knives, means for reciprocating said ram, a second knife holder disposed on the side of the first holder opposite the ram and at a level to receive the vegetable as it is passed through said first knives, a back plate disposed in substantially parallel, spaced relation to the first holder, an opening formed in the back plate, a support comprising a strip of metal, means for pivotally mounting the strip, by one edge, in the opening, yieldable means for pivoting the strip toward the first holder and extending it over the knives of the second, into the path of the vegetable as it is passed through the former, said support serving to hold the vegetable against movement after it has passed the first holder, a second ram slidably mounted between said first holder and the back plate, for movement toward and from said second holder, said ram serving to displace said support into said opening and being provided with pusher bars for forcing the vegetable through the second mentioned blades.

7. A machine for cutting vegetables comprising a trough, a knife holder having a plurality of knives mounted therein, disposed transversely of the trough, a ram slidably mounted in the trough and having pusher means for forcing a vegetable through the knives, an actuating bar disposed transversely of the trough and ram, said ram having bar receiving slots therein which are open at one end, a pair of struts transversely spanning the ram, one disposed on either side of said slots and adjacent the open ends thereof, aligned, central openings in said struts and a pin removably mounted in said openings and extending into the path of the bar to prevent its withdrawal from the slots.

8. A machine for cutting vegetables comprising a trough, a knife holder having a plurality of knives mounted therein, disposed transversely of the trough and removably mounted in grooves formed in the side walls of the trough, a ram slidably mounted in the trough and having pusher means for forcing a vegetable through the knives, an actuating bar disposed transversely of the trough and ram, said ram having bar receiving slots therein which are open at one end, a pair of struts transversely spanning the ram, one disposed on either side of said slots and adjacent the open ends thereof, aligned, central openings in said struts and a pin removably mounted in said openings and extending into the path of the bar to prevent its withdrawal from the slots, a back plate disposed in parallel, spaced relation to said holder, said plate and holder defining a guideway for a second ram, a second actuating bar disposed substantially parallel to the plate for actuating the second ram, slots formed in the second ram, having an open end adjacent the back plate and adapted to receive the second bar, said second ram being held in engagement with said bar by said holder.

References Cited in the file of this patent

UNITED STATES PATENTS

| Number | Name | Date |
| --- | --- | --- |
| 57,111 | Forschner | Aug. 14, 1866 |
| 125,536 | Brunjes | Apr. 9, 1872 |
| 810,998 | Thomas | Jan. 30, 1906 |
| 1,337,968 | Schroeder | Apr. 20, 1920 |
| 1,422,731 | Beucler | July 11, 1922 |
| 1,662,759 | Pollan | Mar. 13, 1928 |
| 2,120,375 | Shaver | June 14, 1938 |
| 2,224,655 | Miller | Dec. 10, 1940 |
| 2,283,029 | Bakewell | May 12, 1942 |
| 2,303,595 | Young | Dec. 1, 1942 |
| 2,353,607 | Young | July 11, 1944 |
| 2,497,289 | Bloomfield | Feb. 14, 1950 |

FOREIGN PATENTS

| Number | Country | Date |
| --- | --- | --- |
| 134,008 | Great Britain | Oct. 21, 1919 |
| 197,450 | Great Britain | May 17, 1923 |